United States Patent
Jiang et al.

(10) Patent No.: US 11,768,696 B2
(45) Date of Patent: Sep. 26, 2023

(54) SECURITY FOR MICROENGINE ACCESS

(71) Applicant: ATI Technologies ULC, Markham (CA)

(72) Inventors: Yinan Jiang, Markham (CA); Kamraan Nasim, Markham (CA); Dezhi Ming, Markham (CA); Ahmed M. Abdelkhalek, Markham (CA); Dmytro Chenchykov, Markham (CA); Andy Sung, Markham (CA)

(73) Assignee: ATI Technologies ULC, Markham (CA)

( * ) Notice: Subject to any disclaimer, the term of this patent is extended or adjusted under 35 U.S.C. 154(b) by 246 days.

(21) Appl. No.: 17/121,678

(22) Filed: Dec. 14, 2020

(65) Prior Publication Data

US 2022/0188139 A1 Jun. 16, 2022

(51) Int. Cl.
*G06F 9/455* (2018.01)
*G06F 9/48* (2006.01)

(52) U.S. Cl.
CPC ...... *G06F 9/45558* (2013.01); *G06F 9/45545* (2013.01); *G06F 9/4812* (2013.01); *G06F 2009/45591* (2013.01); *G06F 2009/45595* (2013.01)

(58) Field of Classification Search
CPC ............. G06F 9/45558; G06F 9/45545; G06F 9/4812; G06F 2009/45591; G06F 2009/45595
See application file for complete search history.

(56) References Cited

U.S. PATENT DOCUMENTS

| | | | | |
|---|---|---|---|---|
| 7,603,488 | B1* | 10/2009 | Gravenstein | G06F 12/023 710/21 |
| 2011/0179414 | A1* | 7/2011 | Goggin | G06F 3/0665 718/1 |
| 2013/0080673 | A1* | 3/2013 | Feehrer | G06F 21/00 710/268 |
| 2013/0159580 | A1* | 6/2013 | Dong | G06F 9/48 710/266 |
| 2014/0380028 | A1* | 12/2014 | Cheng | G06F 9/45558 713/1 |
| 2016/0077848 | A1* | 3/2016 | Tu | G06F 9/45558 718/1 |
| 2019/0004839 | A1* | 1/2019 | Cheng | G06F 9/45558 |
| 2019/0004840 | A1* | 1/2019 | Asaro | G06F 9/4843 |
| 2019/0332373 | A1* | 10/2019 | Zytaruk | G06F 9/45508 |
| 2020/0326974 | A1* | 10/2020 | Arroyo | G06F 9/5077 |

OTHER PUBLICATIONS

Himanshu Raj; High Performance and Scalable I/O Virtualization via Self-Virtualized Devices; Jun. 25, 2007 (Year: 2007).*
Yaozu Dong; High performance network virtualization with SR-IOV; Feb. 15, 2012; (Year: 2012).*

* cited by examiner

*Primary Examiner* — Dong U Kim
(74) *Attorney, Agent, or Firm* — Volpe Koenig (57) ABSTRACT

A technique for managing access to a micro engine, the method comprising: determining that a virtual function "VF") is to be given access to direct communication with a micro engine; in response to the determining, configuring the micro engine to accept direct communication from the VF; monitoring for unpermitted communication; and after a time period has expired, configuring the micro engine to no longer accept direct communication from the VF.

20 Claims, 5 Drawing Sheets

SECURITY FOR MICROENGINE ACCESS

BACKGROUND

Computer virtualization is a technique in which a single set of hardware is shared among different virtual instances of a computer system. Each instance—a virtual machine ("VM")—believes that it owns a whole, hardware computer system, but in reality, the hardware resources of a computer system are shared among the different VMs. Advances in virtualization, including advances in virtualization for devices other than the CPU, system memory, and the like, are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for managing access to a micro engine, the method comprising: determining that a guest virtual machine ("VM") is to be given access to direct communication with a micro engine; in response to the determining, configuring the micro engine to accept direct communication from the guest VM; monitoring for unpermitted communication; and after a time period has expired, configuring the micro engine to no longer accept direct communication from the guest VM. In various examples, the unpermitted communication includes, but is not limited to, "incessant" (too-frequent) communication, or too many consecutive instances of invalid communication (a "fuzz attack").

Figure 1:
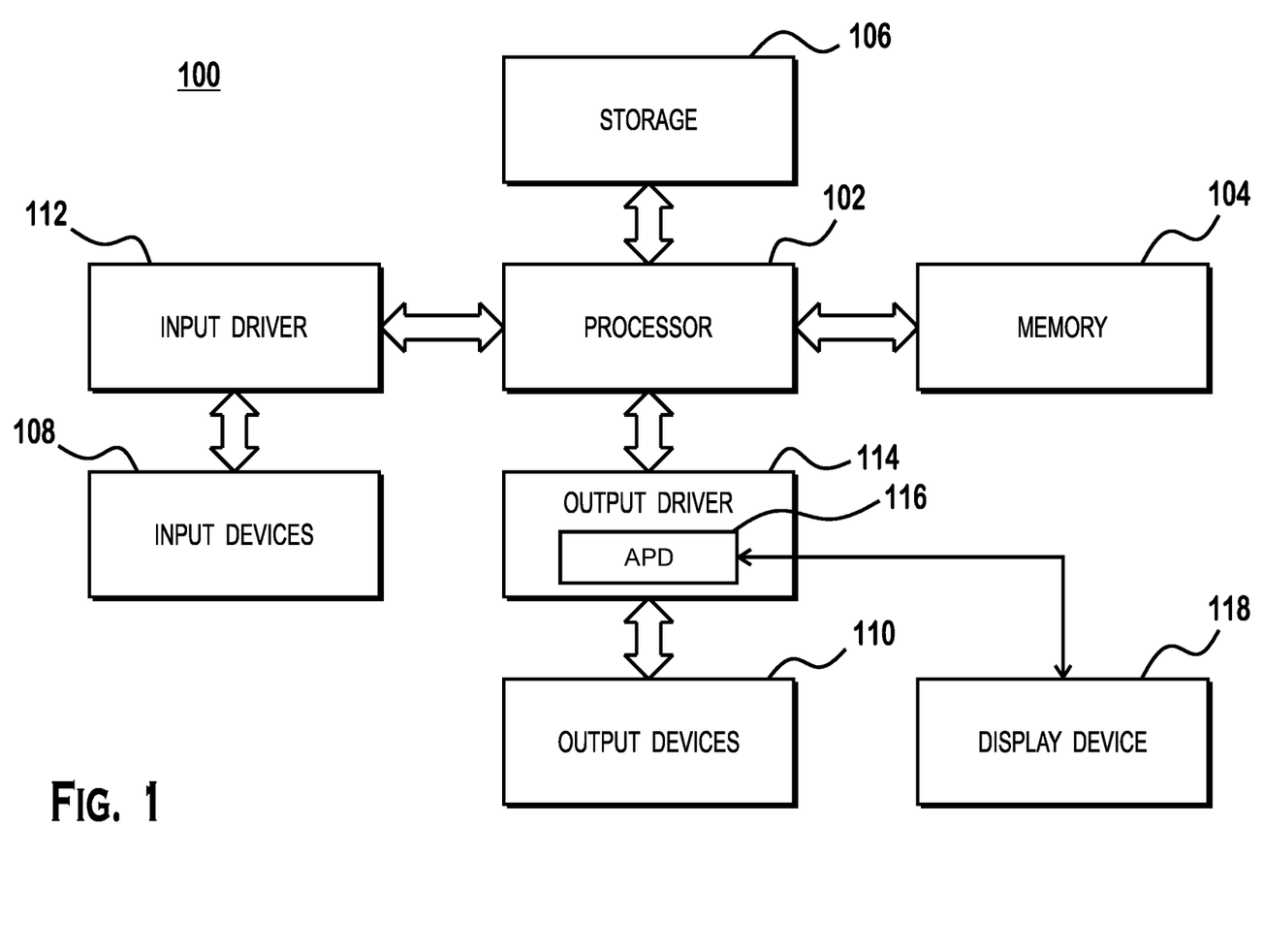
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102 (which may also be referred to as a "host processor"), a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

The processor 102 is configured to support a virtualization scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116.

Figure 2:
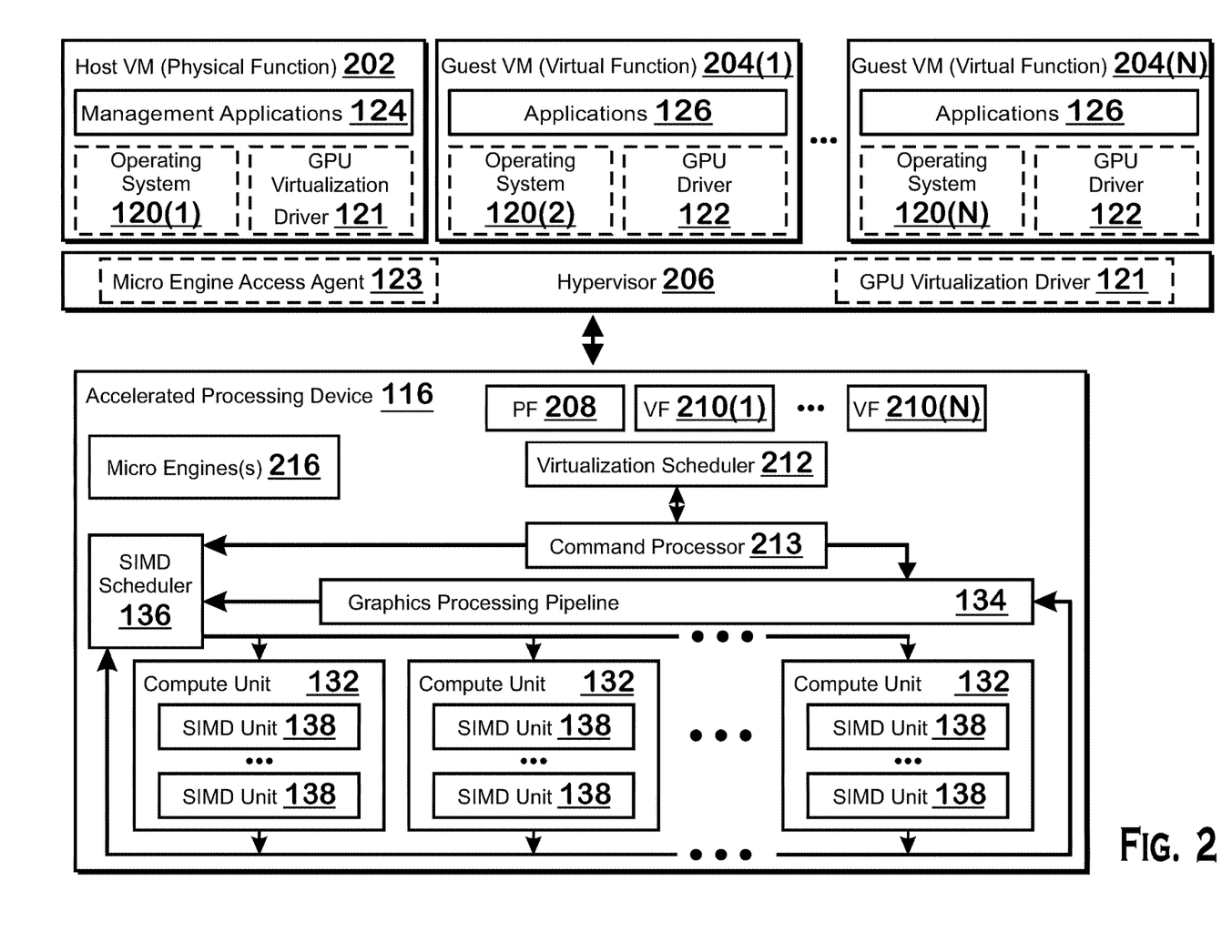
FIG. 2 illustrates details of the device and the accelerated processing device related to virtualization, according to an example.
Figure 3:
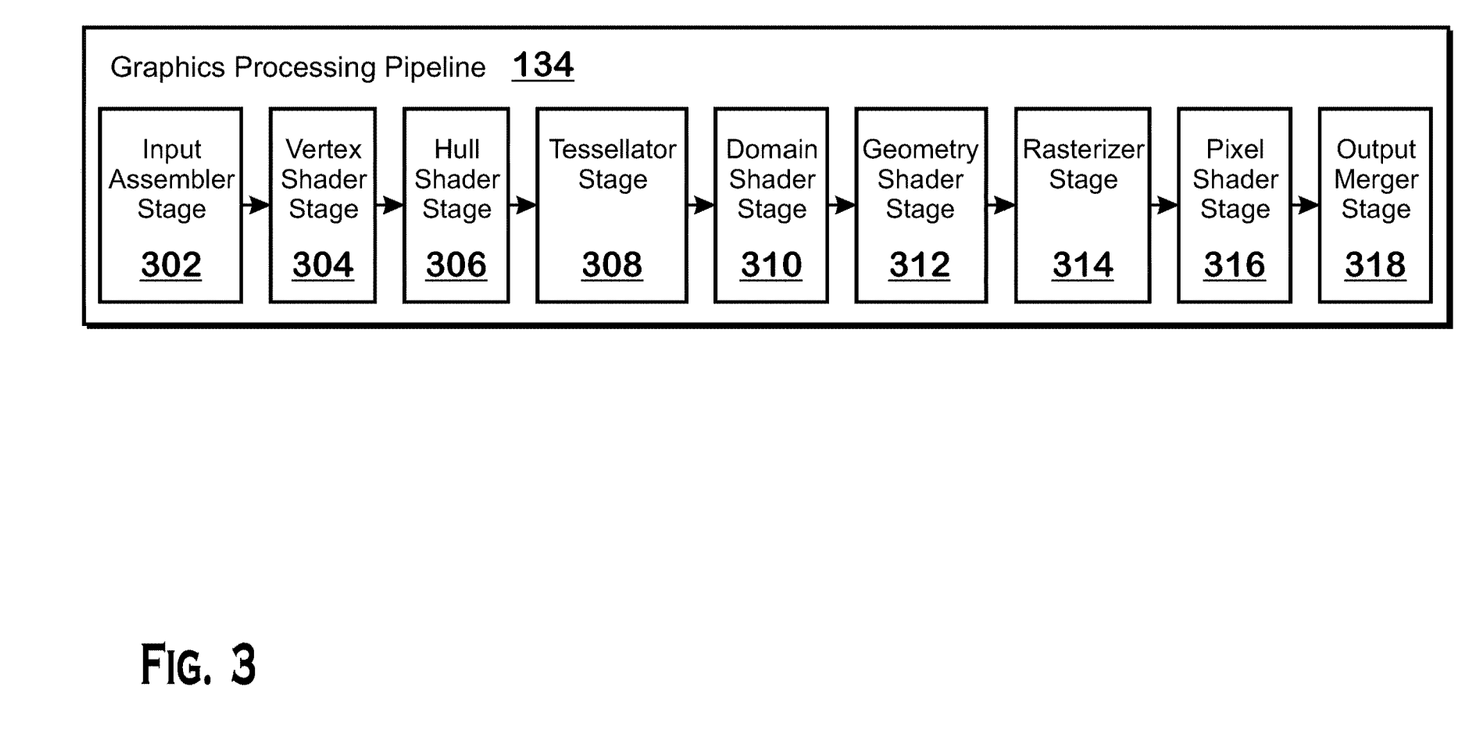
FIG. 3 is a block diagram showing additional details of the graphics processing pipeline illustrated in FIG. 2.

FIG. 2 illustrates details of the device 100 and the APD 116 related to virtualization, according to an example. The processor 102 supports multiple virtual machines. A specialized host virtual machine 202, is not a "general purpose" VM like the guest VMs 204, but instead performs support for virtualization of the APD 116 for use by the guest VMs 204. In some implementations, the host virtual machine 202 is not present. A hypervisor 206 provides virtualization support for the virtual machines, which includes a wide variety of functions such as managing resources assigned to the virtual machines, spawning and killing virtual machines, handling system calls, managing access to peripheral devices, security or firmware level operations on behalf of the virtual machines 204 via physical micro engines, managing memory and page tables, and various other functions.

The APD 116 supports virtualization by allowing time-based sharing or device hardware partitioning of the APD 116 between the virtual machines. On the APD 116, the host VM 202 is mapped to a physical function 208 and guest VMs 204 are mapped to virtual functions 210. "Physical functions" are an addressing parameter in the peripheral component interconnect express ("PCIe") single root input-output virtualization ("SR-IOV") standard. More specifically, physical functions allow communications involving a device coupled to a PCIe interconnect fabric to specify a particular physical function of the device so that the device is able to handle the communications according to functionality specifically assigned to that physical function. In one example, a physical function is associated with regular graphics rendering on a graphics processing device such as the APD 116. Herein, a single physical function is described, but the teachings of the present disclosure apply to APDs 116 for which more than one physical function is active.

Virtual functions are a feature of the PCIe standard that facilitates hardware virtualization and also act as an addressing parameter in the PCIe standard. Typically, a set of virtual functions is associated with a particular physical function. Each virtual machine is assigned one or more different virtual function, with the hypervisor 206 managing the correlation between VMs and virtual functions. This correlation between virtual functions and virtual machines 202 is mostly true in the system of FIG. 2, except that the host VM 202 is able to access the physical function 208 as well as any of the different virtual functions 210 that are assigned to the host VM 202 by the hypervisor 206. In that sense, the host VM 202 acts as a sort of "master virtual machine" for APD virtualization. In some systems, the host VM 202 is not present, with the functions of the host VM 202 described herein performed by the hypervisor 206 instead (which is why the GPU virtualization driver 121 is illustrated in dotted lines in the hypervisor 206). Note that although it is sometimes described herein that virtual functions are associated with virtual machines, it is also possible for the physical function to be associated with one or more virtual machines. Typically, the host VM 202 is considered to be "associated" with the physical function, and guest VMs 204 being associated with virtual functions. Because it is possible for virtual and physical functions to operate in a similar manner in some contexts, the term "function" within the specifier "virtual" or "physical" refers either to virtual functions or physical functions or to both virtual functions and physical functions collectively. For example, in some instances, it might be stated that the APD 116 time-shares operations between functions, which means that the APD 116 is time-shared among different virtual functions and, if actively participating in time-sharing on the APD 116, a physical function. It is not necessary for the physical function to participate in this time sharing, but it is possible for such the physical function to participate. In other instances, hardware is spatially shared between functions. More specifically, different hardware resources of the APD 116 are assigned to execute tasks for different virtual functions at the same time.

As described above, physical functions and virtual functions are addressing parameters in PCIe. Transactions over PCIe thus are associated with a physical function and optionally, additionally, a virtual function. Addressing over PCIe may be made explicitly, via a bus-device-function number paradigm, but this addressing paradigm is usually reserved for device configuration (e.g., PCIe device enumeration) or for other situations. More typically, and in standard operation, transactions over PCIe are made by memory address, with the PCIe fabric routing the transaction to an appropriate device and physical function and/or virtual function, based on a memory map. In this scenario, a VM would make an access to a memory address and the hypervisor or translation layer would translate the provided memory address, which is in guest physical memory address space, to an address in the system physical memory address space that is mapped to the APD 116. This translated address does not explicitly include an indication of a virtual function but is mapped to a particular virtual function via a memory map and is routed to that virtual function by the routing functionality of the PCIe fabric. Transactions over PCIe made via memory mapped addresses do not explicitly specify virtual or physical function numbers.

Sharing the APD 116 among the different virtual machines is accomplished by time-dividing or spatially partitioning the operations of the APD 116 among the different virtual machines, with different virtual functions (or the physical function) assigned to different virtual machines. A virtualization scheduler 212 performs work related to time-sharing the APD 116, scheduling a new virtual machine for operation by switching from work for a current virtual machine as the execution time assigned to that virtual machine elapses. Although the APD 116 is shared among the different virtual machines, each virtual machine perceives that it has an individual instance of a real, hardware APD 116.

The host VM 202 and the guest VMs 204 have operating systems 120. The host VM 202 has management applications 124 and a GPU virtualization driver 121. The guest VMs 204 have applications 126, an operating system 120, and a GPU driver 122. These elements control various features of the operation of the processor 102 and the APD 116.

As stated above, the host VM 202 configures aspects of virtualization in the APD 116 for the guest VMs 204. Thus the host VM 202 includes an operating system 120 that supports execution of other elements such as management applications 124 and a GPU virtualization driver 121. The GPU virtualization driver 121 is not a traditional graphics driver that simply communicates with and sends graphics rendering (or other) commands to the APD 116, without understanding aspects of virtualization of the APD 116. Instead, the GPU virtualization driver 121 communicates with the APD 116 to configure various aspects of the APD 116 for virtualization. In one example, the GPU virtualization driver 121 manages parameters related to the time-slicing mechanism for sharing the APD 116 among the different VMs, controlling parameters such as how much time is in each time-slice, how switching is performed between different virtual functions, and other aspects. Note, the GPU virtualization driver 121 may also issue traditional graphics rendering commands to the APD 116 or may perform other tasks not directly related to configuration of the APD 116. The management applications 124 perform one or more tasks for managing virtualization and/or that involve data from two or more different guest VMs 204. In one example, the host VM 202 performs a desktop compositing function through a management application 124, where the desktop compositing function has access to rendered frames from the different guest VMs 204 and composites those frames into a single output view. In another example, the GPU virtualization driver 121 manages parameters related to spatial partitioning for sharing the APD 116 among the different VMs, controlling parameters such as which hardware resources are assigned to which VMs. In some examples, time-slicing and "spatial partitioning" is mixed to assign different resources to different VMs in different time slots.

The guest VMs 204 include an operating system 120, a GPU driver 122, and applications 126. The operating system 120 is any type of operating system that could execute on processor 102. The GPU driver 122 is a "native" driver for the APD 116 in that the GPU driver 122 controls operation of the APD 116 for the guest VM 204 on which the GPU driver 122 is running, sending tasks such as graphics rendering tasks or other work to the APD 116 for processing. The native driver may be an unmodified or slightly modified version of a device driver for a GPU that would exist in a bare-metal non-virtualized computing system.

Although the GPU virtualization driver 121 is described as being included within the host VM 202, in other implementations, the GPU virtualization driver 121 is included in the hypervisor instead 206. In such implementations, the host VM 202 may not exist and functionality of the host VM 202 may be performed by the hypervisor 206.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The GPU driver 122 controls operation of the APD 116 for any particular guest VM 204 by, for example, providing an application programming interface ("API") to software (e.g., applications 126) to access various functionality of the APD 116. In some implementations, the driver 122 also includes a just-in-time compiler that compiles shader programs for execution by processing components (such as the SIMD units 138 discussed in further detail below) of the APD 116. In some examples, the just-in-time compiler receives uncompiled programs from an application, and compiles those programs for execution on the APD 116. For any particular guest VM 204, the GPU driver 122 controls functionality on the APD 116 related to that guest VM 204, and not for other VMs.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In various examples, the APD 116 also includes hardware for performing multimedia operations such as video and image encoding and decoding. A command processor 213 accepts commands from the processor 102 (or another source), and delegates tasks associated with those commands to the various elements of the APD 116 such as the graphics processing pipeline 134 and the compute units 132. The VMs inform the APD 116 regarding new tasks for execution via a doorbell mechanism.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 includes one or more micro engines 216. A micro engine 216 is a resource, such as hardware or software or firmware that executes on a processor, and provides services to one or more guest VMs 204. In some implementations, the micro engines 216 are expected to be directly communicated with by guest VMs 204 in a certain time period, such as during VM 204 initialization or deinitialization. The term "direct communication" involves the guest VM 204 sending a communication directly to the micro engine 216 without mediation by the hypervisor 206 or the host operating system (e.g., operating system 120(1) in the host VM 202). In an example, this direct communication is performed with a doorbell mechanism. In an example, communication via a doorbell mechanism includes a guest VM 204 writing data to a particular memory location, associated with the doorbell, or particular hardware register connected to an interrupt line. The memory location is mapped to the doorbell of a micro engine 216. A memory management system, such as a peripheral component interconnect express fabric, routes writes to this memory location or register write to the micro engine 216. The micro engine 216 processes the doorbell "ring" in response to detecting the write to this memory location.

In some examples, in response to the micro engine 216 receiving the doorbell ring, the micro engine 216 triggers an interrupt, which triggers an interrupt handler that pre-empts the current task of the micro engine 216 in order to process the doorbell ring. Often, these micro engines 216 are small footprint, single core micro-controllers that follow an interrupt driven micro-architecture, as opposed to a polling-based design. While this operation is useful to perform appropriate work such as operations for guest VM 204 initialization or deinitialization, it is possible for doorbell rings to a micro engine 216 to occur maliciously or unintentionally. Because such malicious or unintentional doorbell rings can disrupt the work that the micro engine 216 should be performing, a micro engine access agent 123 controls access to the one or more micro engines 216.

The micro engine access agent 123 is embodied as one or hardware (e.g., hardware circuitry), software executing on a processor, or combination hardware and software. The micro engine access agent 123 controls when a virtual function 210 which is assigned to a guest VM 204 doorbell ring is received by a micro engine 216. Generally, the GPU virtualization driver 121 instructs the micro engine access agent 123 regarding when to respond to doorbell rings from one or more virtual functions 210 and when to ignore doorbell rings from one or more virtual functions 210. In one example, the hypervisor informs the GPU virtualization driver 121 of when a virtual function 210 is initialized or de-initialized. The GPU virtualization driver 121 instructs the micro engine access agent 123 regarding this initialization or de-initialization. The micro engine access agent 123 controls one or more micro-engines 216 to process doorbell rings in a time period around this initialization or de-initialization time and controls the one or more micro-engines 216 to ignore doorbell rings after this time period has ended. This operation provides the virtual function 210 with access to the micro engines 216 during appropriate times while limiting the opportunity for virtual functions 210 to interfere with the proper functioning of the micro engines 216 by sending spurious doorbell rings.

In some examples, the micro engine access agent 123 controls access to doorbells by enabling or disabling interrupts in the micro engine 216. More specifically, as described elsewhere herein, in some examples, writing a doorbell for a micro engine 216 triggers an interrupt on the micro engine 216 targeted by the doorbell. To enable or disable the doorbell, the micro engine access agent 123 thus enables or disables the interrupt corresponding to the doorbell. In some examples, a micro engine 216 is capable of enabling or disabling doorbells on a per-virtual function 210 basis. In other words, a micro engine 216 is capable of enabling an interrupt for doorbells received from a particular virtual function 210, while disabling an interrupt for doorbells received from a different virtual function 210. In such examples, the micro engine access agent 123 instructs one or more micro engines 216 to disable interrupts for doorbells received from a particular virtual function 210. In some examples, the specific virtual function 210 is identified by virtual function number. In other examples, a micro engine 216 is cable of enabling or disabling interrupts for a micro engine 216 in a manner that is not specific to particular virtual functions 210. In other words, some micro engines 216 are not capable of disabling interrupts for some virtual functions 210 but not others. In such instances, the micro engine access agent 123 enables interrupts for the micro engine 216 for all virtual functions 210 during the time period for direct communication with the micro engine 216 for any of the virtual functions 210.

Some example micro engines 216 are now provided. One example micro engine 216 is a security processor such as the "AMD Platform Security Processor." A security processor provides features such as managing the boot process, initializing security related mechanisms, and monitoring the device 100 for suspicious activity and implementing appropriate response. In some examples, the direct interactions between a guest VM 204 and a security processor via a doorbell mechanism are expected to occur during initialization and deinitialization and not at other times.

Another example micro engine 216 is a multimedia scheduler. The multimedia scheduler schedules time (performs "world switches") on various multimedia accelerators for the different VMs 204. Example multimedia accelerators include video encoding or decoding accelerators, image encoders or decoders, or other accelerators.

Another example micro engine 216 is a run list controller (e.g., the virtualization scheduler 212). The run list controller schedules time slots (performs world switches) for the APD 116. Another example micro engine 216 is a power management engine. The power management engine provides power management functionality, clock functionality, and other power functionality. Each of these example micro engines 216 expect input (such as configuration input) at set times, such as during initialization or de-initialization.

In addition to preventing or allowing the processing of doorbell rings, the micro engine access agent 123 also monitors for communication patterns that are not permitted. In general, such communication patterns are patterns that indicate a malicious attack is being performed or indicate that a malfunction is occurring that could interfere with the operation of the micro engine 216. One type of such communication pattern includes the rate of requests via doorbell exceeding a rate threshold. Allowing a high rate of such requests could, by occupying processing time of a micro engine 216, disrupt service to other guest VMs 204. Another type of such communication pattern includes a number of consecutive invalid requests via doorbell, where the number is higher than a threshold. A request is "invalid" in the situation that the request is uninterpretable by the micro engine 216 (due to, for example, including an instruction code that indicates no valid instruction) or due to including other corrupted data. Such a pattern could indicate that a malicious attack is occurring from a particular guest VM 204 that could, for example, deny access to a micro engine 216 for other VMs 204.

For the above reasons, in the situation that the micro engine access agent 123 or micro code running on the micro engine 216 detects either of the two communication patterns, the micro engine access agent 123 or microcode running on the micro engine 216 disables access to the micro engine 216. In one example, disabling access includes the micro engine access agent 123 disabling the doorbell mechanism for the micro engine 216 to which the not permitted communication patterns are directed. In some examples, this disabling occurs for the virtual function in the guest VM 204 that performed the not permitted communication patterns but not for other virtual functions in the same VM 204 or for other guest VMs 204. In other examples, this disabling occurs for all virtual functions across different guest VMs 204. In some examples, the micro engine access agent 123 disables doorbell access for the guest VM 204 that performed the not permitted communication patterns to the micro engine 216 to which such communication is directed, as well as to other micro engines 216. In some examples, the micro engine access agent 123 disables doorbell access for that guest VM 204 to all micro engines 216.

Figure 4:
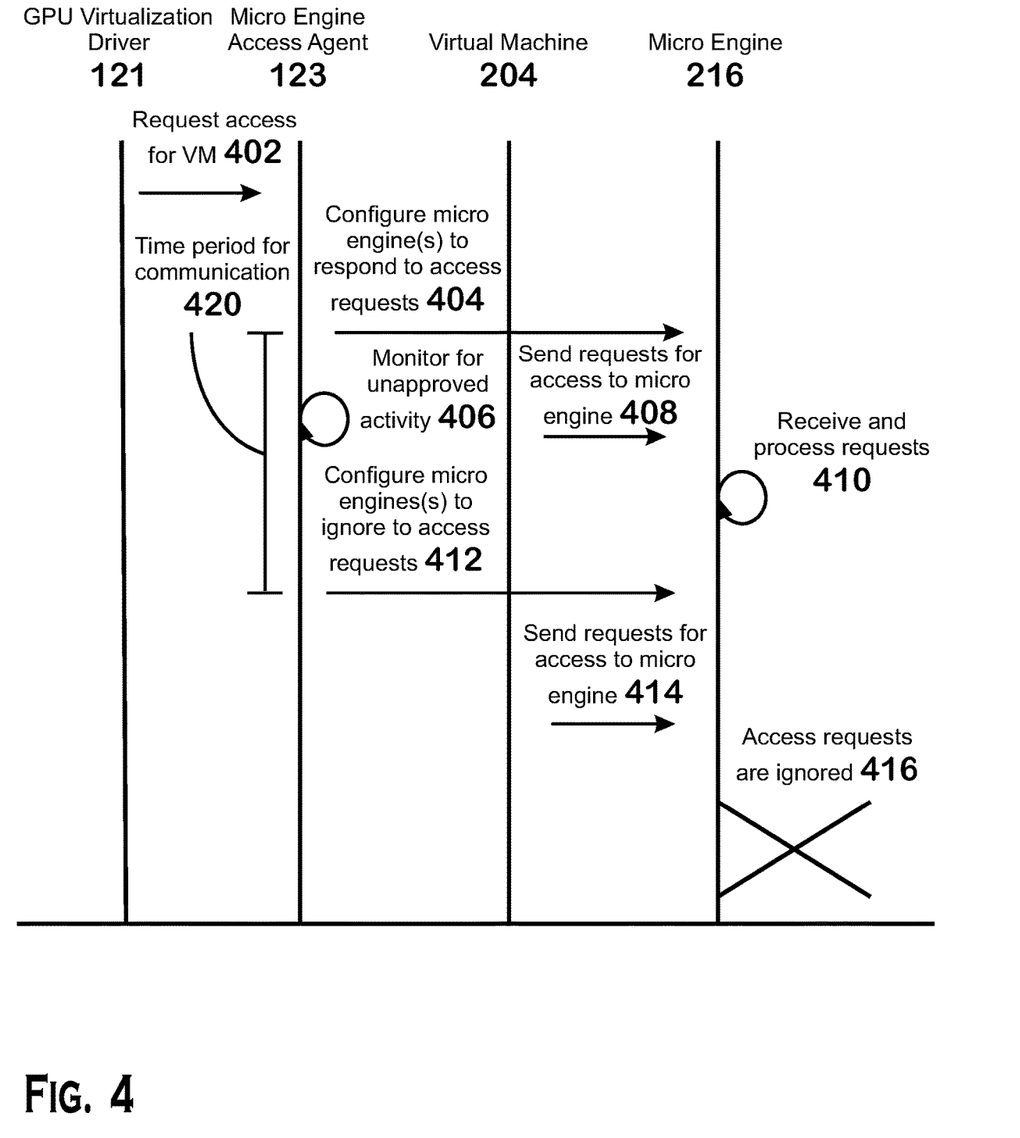
FIG. 4 is a sequence diagram that illustrates example operations for managing access of guest VMs to micro engines.

FIG. 4 is a sequence diagram that illustrates example operations for managing access of guest VMs 204 to micro engines 216. In operation 402, the GPU virtualization driver 121 requests access for a VM 204. This operation 402 is, in some examples, performed in response to the VM being initialized or deinitialized. At operation 404, the micro engine access agent 123 configures one or more micro engines 216 to respond to access requests from the VM 204. In some examples, the sequence diagram begins with the one or more micro engines 216 being configured to not respond to access requests from the VM 204. In some examples, the access requests include "ringing" a doorbell as described elsewhere herein. In some examples, configuring the micro engines to respond to access requests includes enabling an interrupt that is triggered in response to a guest VM 204 "ringing" a doorbell.

The time period for communication 420 represents a time period in which the guest VM 204 is permitted to communicate with the micro engine(s) 216 discussed via the mechanism discussed herein. This time period 420 is configurable in any technically feasible manner. In some examples, the duration of this time period 420 is preprogrammed into the micro engine access agent 123. In examples, different micro engines 216 have different time durations during which access is permitted in this manner.

In operation 406, during the time period 420, the micro engine access agent 123 or microcode running on the micro engine monitors for unapproved activity. Several examples of such unapproved activity include a threshold number of invalid commands being transmitted, or the rate of commands exceeding a threshold, as described elsewhere herein. Although not shown in FIG. 4, upon detecting such unapproved activity, the micro engine access agent 123 instructs the micro engine 216 to disable access for at least the offending VM 204, or microcode running on the micro engine automatically disables access for the offending VM 204, as described elsewhere herein.

At operation 408, the virtual machine 204 communicates with the micro engine 216 according to the now enabled communication mechanism. Examples include ringing a doorbell to perform configuration operations. At operation 410, the micro engine 216 receives and processes the requests 410. At step 412, the micro engine access agent 123 configures the micro engines 216 to now ignore access requests. These access requests refer to the access requests for which the micro engine access agent 123 granted access at operation 404. Operations 414 and 416 represent the fact that requests for access from guest VMs 204 are ignored after the micro engine access agent 123 causes the micro engine 216 to ignore those requests, or microcode running on the micro engine 216 automatically ignores those requests.

Figure 5:
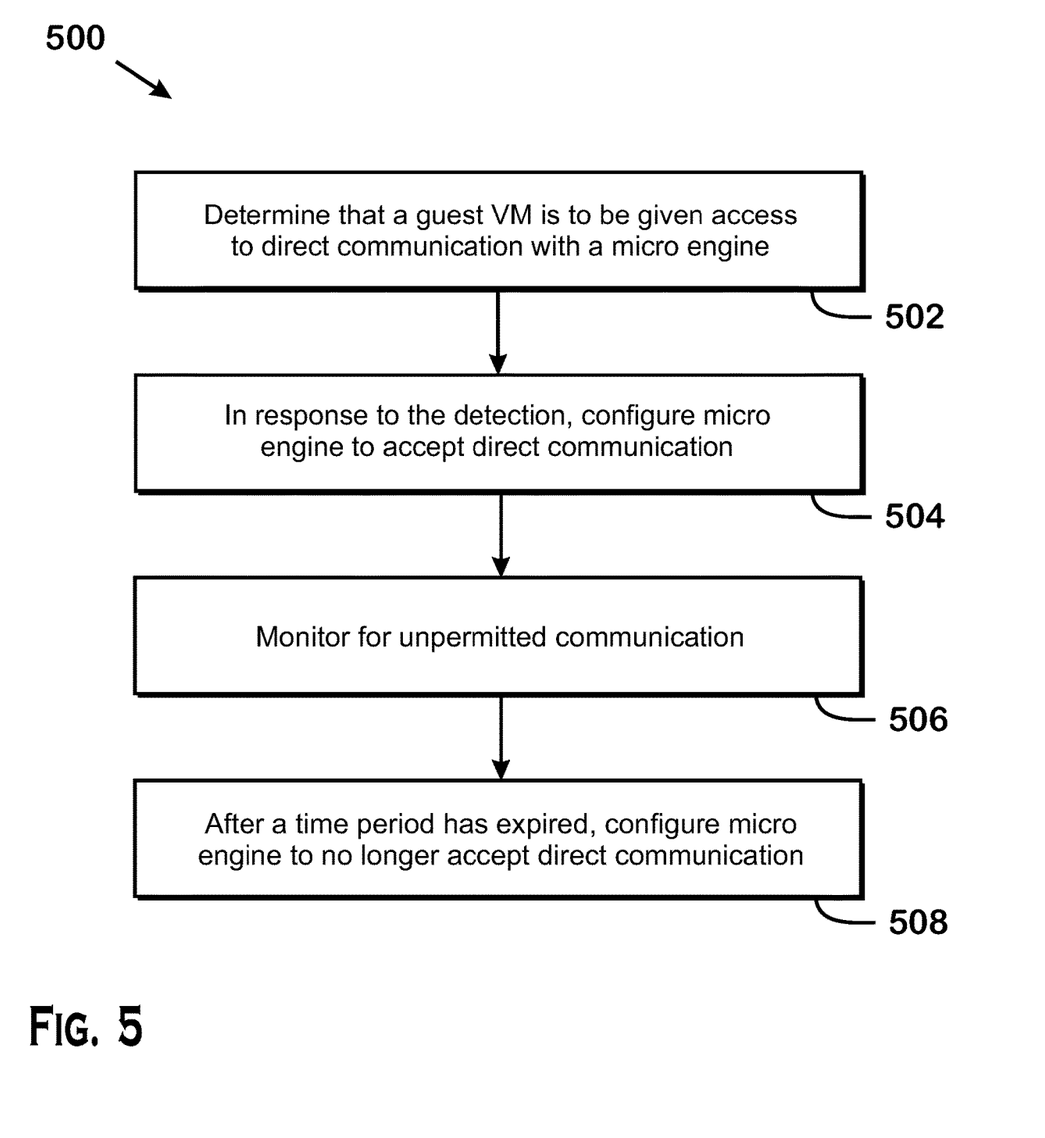
FIG. 5 is a flow diagram of a method for managing access to a micro engine, according to an example.

FIG. 5 is a flow diagram of a method 500 for managing communication with a micro engine 216, according to an example. Although described with respect to the system of FIGS. 1-4, those of skill in the art will recognize that any system, configured to perform the steps of the method 500 in any technically feasible order, falls within the scope of the present disclosure.

At step 502, the micro engine access agent 123 determines that a virtual function 210 is to be given access to direct communication with a micro engine 216. In examples, the direct communication includes ringing a doorbell of the micro engine 216 by the virtual function 210. In an example, the determination of step 502 occurs due to the micro engine access agent 123 receiving a communication directing the micro engine access agent 123 to give access. In an example, this communication is received from a GPU virtualization driver 121, in response to the GPU virtualization driver 121 determining that the virtual function 210 is being initialized or deinitialized.

At step 504, in response to the determination, the micro engine access agent 123 configures one or more micro engines 216 to accept the direct communication. In an example, this step is performed by enabling interrupts in response to a doorbell ring by the virtual function 210. In another example, this step is performed by enabling interrupts in response to a doorbell ring, without consideration of which virtual function 210 such doorbell ring comes from.

At step 506, the micro engine access agent 123 or microcode running on the micro engine 216 monitors for unpermitted communication. In an example, unpermitted communication includes the guest VM 204 communicating with the micro engine 216 too frequently (e.g., rings a doorbell of the micro engine 216 with a frequency that is greater than a threshold frequency). In another example, unpermitted communication includes the guest VM 204 providing too many consecutive invalid commands (e.g., transmitting a number of consecutive invalid commands that is greater than a threshold number).

At step 508, after a time period has expired, the micro engine access agent 123 configures the micro engine 216 to no longer accept direct communication. In some examples, this step includes disabling interrupts for the micro engine 216 for the virtual function 210 or disabling interrupts for the micro engine 216 for any virtual function 210.

It should be understood that many variations are possible based on the disclosure herein. For example, although PCIe has been described herein as a particular interconnect fabric, any other technically feasible interconnect fabric may be alternatively used. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for managing access to a micro engine, the method comprising:
during a virtual machine initialization period, determining that a virtual function ("VF") associated with the virtual machine is to be given access to direct communication with the micro engine;
in response to the determining, configuring the micro engine to accept direct communication from the VF through an interrupt-based doorbell mechanism; and
after a pre-programmed time period has expired, configuring the micro engine to no longer accept direct communication from the VF via the interrupt-based doorbell mechanism.

2. The method of claim 1, wherein the determining occurs in response to the VF being initialized or deinitialized.

3. The method of claim 1, wherein configuring the micro engine to accept direct communication from the VF includes enabling an interrupt on the micro engine.

4. The method of claim 3, wherein enabling the interrupt includes enabling the interrupt for the VF but not for other VFs.

5. The method of claim 3, wherein enabling the interrupt includes enabling the interrupt for the VF and other VFs.

6. The method of claim 1, further comprising monitoring for unpermitted communication, wherein the unpermitted communication includes a doorbell of the micro engine being accessed with a frequency that is higher than a threshold frequency.

7. The method of claim 1, further comprising monitoring for unpermitted communication, wherein the unpermitted communication includes the VF providing a number of invalid requests to the micro engine, wherein the number is greater than a threshold.

8. The method of claim 1, further comprising, further comprising monitoring for unpermitted communication, and, in response to detecting unpermitted communication, configuring the micro engine to no longer accept direct communication from the VF.

9. The method of claim 1, wherein configuring the micro engine to no longer accept direct communication from the VF includes disabling interrupts associated with the direct communication.

10. A device, comprising:
a set of one or more processors operating as micro engines; and
a permissions agent comprising one of a micro engine access agent or microcode executing in one or more micro engines of the set of micro engines,
wherein the permissions agent is configured to
during a virtual machine initialization period, determine that a virtual function ("VF") associated with the virtual machine is to be given access to direct communication with a micro engine of the set of one or more micro engines;
in response to the determining, configure the micro engine to accept direct communication from the VF through an interrupt-based doorbell mechanism; and
after a pre-programmed time period has expired, configure the micro engine to no longer accept direct communication from the VF via the interrupt-based doorbell mechanism.

11. The device of claim 10, wherein the determining occurs in response to the VF being initialized or deinitialized.

12. The device of claim 10, wherein configuring the micro engine to accept direct communication from the VF includes enabling an interrupt on the micro engine.

13. The device of claim 12, wherein enabling the interrupt includes enabling the interrupt for the VF but not for other VFs.

14. The device of claim 12, wherein enabling the interrupt includes enabling the interrupt for the VF and other VFs.

15. The device of claim 10, wherein the permissions agent is further configured to monitor for unpermitted communication, wherein the unpermitted communication includes a doorbell of the micro engine being accessed with a frequency that is higher than a threshold frequency.

16. The device of claim 10, wherein the permissions agent is further configured to monitor for unpermitted communication, wherein the unpermitted communication includes the VF providing a number of invalid requests to the micro engine, wherein the number is greater than a threshold.

17. The device of claim 10, wherein the permissions agent is further configured to monitor for unpermitted communication, wherein the permissions agent is further configured to, in response to detecting unpermitted communication, configure the micro engine to no longer accept direct communication from the VF.

18. The device of claim 10, wherein configuring the micro engine to no longer accept direct communication from the VF includes disabling interrupts associated with the direct communication.

19. A non-transitory computer-readable medium storing instructions that, when executed by a processor, cause the processor to:
during a virtual machine initialization period, determine that a virtual function ("VF") associated with the virtual machine is to be given access to direct communication with a micro engine;
in response to the determining, configure the micro engine to accept direct communication from the VF through an interrupt-based doorbell mechanism;
monitor for unpermitted communication; and
after a pre-programmed time period has expired, configure the micro engine to no longer accept direct communication from the VF via the interrupt-based doorbell mechanism.

20. The non-transitory computer-readable medium of claim 19, wherein the determining occurs in response to the VF being initialized or deinitialized.

* * * * *